Sept. 1, 1970  S. A. WHITE  3,526,756
PARAMETRIC CORRELATION APPARATUS
Filed Jan. 31, 1969  4 Sheets-Sheet 2

INVENTOR.
STANLEY A. WHITE
BY
ATTORNEY

INVENTOR.
STANLEY A. WHITE

Sept. 1, 1970            S. A. WHITE            3,526,756

PARAMETRIC CORRELATION APPARATUS

Filed Jan. 31, 1969                            4 Sheets-Sheet 4

*INVENTOR.*
STANLEY A. WHITE

BY

*ATTORNEY*

United States Patent Office 3,526,756
Patented Sept. 1, 1970

3,526,756
PARAMETRIC CORRELATION APPARATUS
Stanley A. White, Yorba Linda, Calif., assignor to North American Rockwell Corporation
Filed Jan. 31, 1969, Ser. No. 795,417
Int. Cl. G06g 7/38; G05b 13/00
U.S. Cl. 235—151.3                               7 Claims

ABSTRACT OF THE DISCLOSURE

Means for determining the coefficients $a_n$ of a lumped parameter describing function, $\Sigma a_n y_n = 0$, and comprising a plurality of gain-adjustable signalling channels, each channel adapted to be responsive to a mutually exclusive one of the variables $y_n$ of the describing function, each channel comprising a correlator having a reference input for adjusting the gain of said gain-adjustable channel as a function of the correlation of an input to said signalling channel with an applied reference input. Signalling means responsive to a gain-adjusted output of each of the signalling channels provides a reference signal indicative of a preselected function of the sum of the gain-adjusted outputs of the signalling channels, the reference inputs of the correlators being commonly responsive to said reference signal, whereby an output of each correlator is indicative of a coefficient $a_n$ of that variable $y_n$ correlated by such correlator.

BACKGROUND OF THE INVENTION

Frequently, in the utilization or control of a controllable element such as, for example, an aircraft, it is necessary to construct a mathematical model of the control dynamics or response characteristics of the controllable element in order to synthesize the requirements of an adequate controller and the stability and control limitations imposed by the controllable element. Such mathematical model may be constructed, employing the theory of small perturbations, to derive linear integro-differential equations, the coefficients of which represent equivalent lumped parameters of a lumped parameter system.

In the past, the quantitative determination of such coefficients has been laborious, involving a number of measurements of static performance parameters (from wind-tunnel tests and the like, in the case of aircraft) or sampled frequency-response data, requiring extensive reductions of data to evolve the information of interest. Such prior art efforts to quantitatively determine such lumped parameters of a multiple parameter plant are also time-consuming, as to involve considerable delay or lead-time in the scheduling of control system design efforts. Further, the accuracy of the results of such prior-art static testing methods is generally limited, as to often necessitate redesign efforts, further increasing the delay and costs in arriving at a suitable control system.

The prior art, as disclosed in U.S. Pat. No. 3,393,301 has included means for determining the deviation of the coefficients of a describing function (of limited form) from those of a preselected describing function, as a failure-monitoring function, a preselected degree or threshold of deviation being employed as indicative of a failure mode. In such arrangement, an input to and the output of a unit-under-test are measured during normal operation (on-stream testing) of the unit. However, such prior art does not teach the quantitative determination of the actual coefficients of the mathematical model describing such unit.

SUMMARY OF THE INVENTION

By means of the concept of the subject invention, the above-noted limitations of the prior art are avoided, and means is provided for automatically quantitatively determining the coefficients ($a_n$) of a lumped parameter mathematical model ($\Sigma a_n y_n = 0$) of a multi-parameter device by direct (on-stream) measurement of the responses ($y_n$) of such device while operating in its intended operating environment.

In a preferred embodiment of the invention, there is provided a plurality of gain-adjustable signalling channels, each adapted to be responsive to a mutual exclusive one of the variables ($y_n$) and comprising a correlator having a reference input for adjusting the gain of the gain-adjustable channel as a function of the correlation of an applied input ($y_n$) with a reference signal (applied to said reference input). There is also provided signalling means responsive to a gain-adjusted output of each of the signalling channels for providing a reference signal indicative of a preselected function of the sum of such gain-adjusted outputs, the reference input of each correlator being commonly responsive to the reference signal.

In normal operation of the above-described arrangement, the applied inputs to the correlators are selected to represent the variables of interest in a selected form of mathematical model, presumed to adequately describe the plant or device under test, when suitably excited or stimulated. The correlators, in changing the gains of the signalling channels, cooperate to tend to reduce the sum of the gain-adjusted outputs of the signalling channels to a null. Under such null condition, the output of each correlator is indicative of a coefficient $a_n$ of that variable $y_n$ correlated such correlator. Thus, the coefficients of the lumped parameter model describing the device under test, are automatically determined within a minimum time interval by direct measurement of the device itself. Accordingly, it is an object of the invention to provide improved means for determining the coefficients ($a_n$) of a lumped parameter mathematical model, $\Sigma a_n y_n = 0$, of a physical system.

Another object of the invention is to provide means for automatically determining the coefficients of a lumped parameter mathematical model of a physical system.

A further object is to provide rapid and efficient means for determining the coefficients of a lumped parameter mathematical model of a physical system of interest.

These and further objects of the invention will become apparent from the following description, taken together with the accompanying drawings, in which:

DESCRIPTION OF THE PREFERRED EMBODIMENTS

Figure 1:
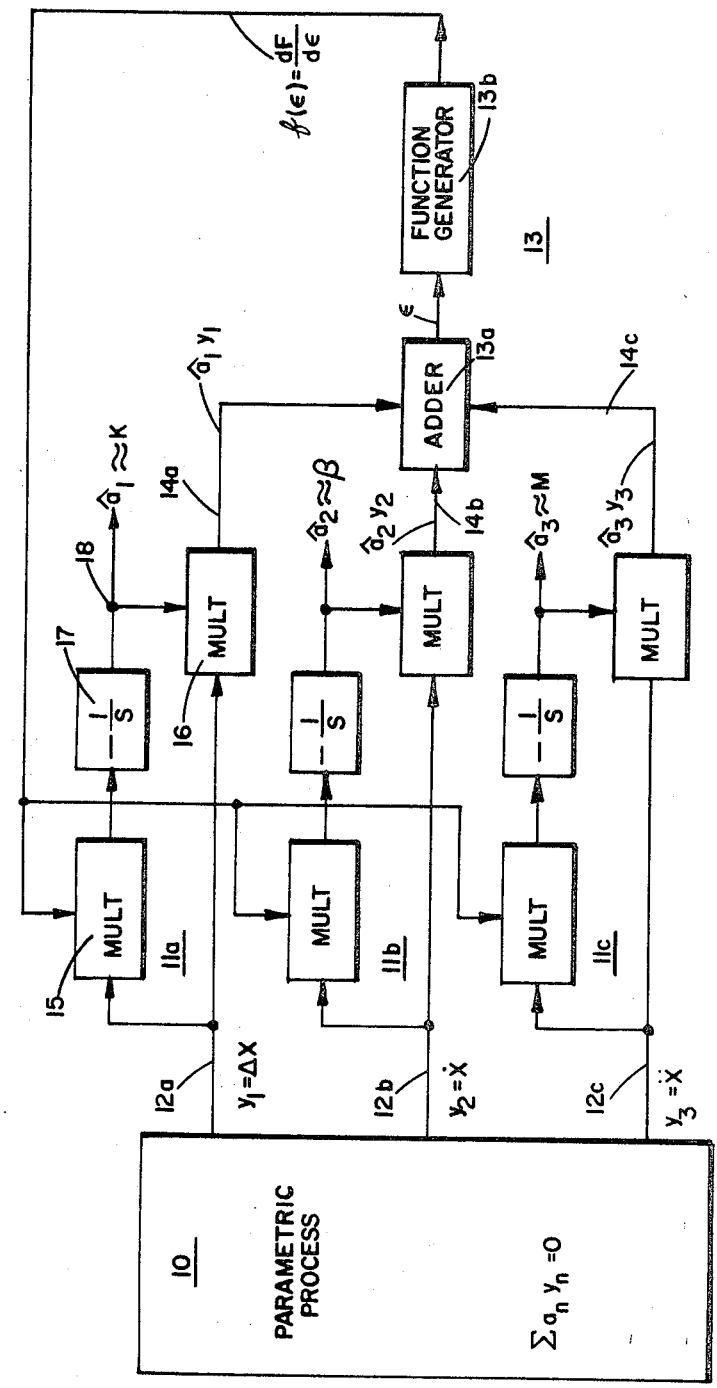
FIG. 1 is a block diagram of a system embodying an aspect of the inventive concept.

Referring to FIG. 1, there is illustrated a block diagram of a system embodying an aspect of the inventive concept. There is provided means for determining the coefficients $a_n$ of a lumped parameter mathematical model, $\Sigma a_n y_n = 0$, describing the response of a physical plant 10. There is provided a plurality of like gain-adjustable signalling channels 11a, 11b, and 11c, each having an input 12a, 12b 12c adapted to be responsive to a mutually exclusive one of the variables $y_n$ of the response of element 10 by means of suitable sensors (not shown). There is also provided signalling means 13 comprising signal summing means 13a responsive to the gain adjusted outputs 14a, 14b and 14c of signalling channels 11a, 11b and 11c for providing an output $\epsilon$ indicative of the sum of the applied inputs thereto. A function generator 13b is responsively coupled to summing means 13a for providing a reference signal indicative of a preselected function of $\epsilon$.

Each of like gain adjustable signalling channels 11a, 11b and 11c includes a first and second multiplier 15 and 16, each having a first input commonly connected to define an input terminal of the signalling channel. For example, in channel 11a the interconnection of the first inputs of multipliers 15 and 16 defines channel input 12a. A second input of first multiplier 15 is coupled to an output of function generator means 13b. There is further provided in each signalling channel an integrator 17 having an input coupled to an output of first multiplier 15 and further having an output 18 coupled to a second input of second multiplier 16. Each of integrators 17 is shown as a phase inverting integrator, although such phase inversion may be accomplished by any of the elements 13a, 13b, 15, 16, or 17 in FIG. 1.

In normal operation of the above described arrangement, first multiplier 15 and integrator 17 in each signalling channel cooperate as correlation means for adjusting the gain of such channel as a function of the correlation of an applied input to such channel with the reference output of function generator 13b. The correlation signal on output line 18 of integrator 17 varies the gain of second multiplier 16 in a sense which tends to reduce the output $\epsilon$ of adder 13a to a null.

Such arrangement may be employed to estimate the quantitative coefficients of the lumped parameters of a mathematical model of plant 10, the outputs 18 of integrators 17 corresponding to such coefficients. For example, where plant 10 is a linear second order system such as a viscous damped mass-spring system, the mathematical model or characteristic equation therefor may be written as follows:

$$\Sigma a_n y_n = a_1 y_1 + a_2 y_2 + a_3 y_3 = 0 \quad (1)$$

$$\Sigma a_n y_n = K\Delta X + B\dot{X} + M\ddot{X} = 0 \quad (2)$$

where:

$a_1 = K$, spring constant
$a_2 = B$, viscous damping constant
$a_3 = M$, system mass
$y_1 = \Delta X$, displacement
$y_2 = \dot{X}$, rate of displacement
$y_3 = \ddot{X}$, acceleration In Laplace notation:

$$X(K + \beta s + Ms^2) = 0 \quad (3)$$

where: $s =$ Laplace operator

In other words, such characteristic equation describes the motion dynamics of the system in response and subsequent to an initial disturbance or impulse excitation. The transfer function $G(s)$ of such exemplary second order system for element 10, may then be determined:

$$G(s) = \frac{1}{K + \beta s + Ms^2} \quad (4)$$

Transposing, $$G(s) = \frac{1/K}{1 + \frac{B}{K}s + \frac{s^2}{K/M}} \quad (5)$$

which is of the form:

$$G(s) = \frac{1/K}{1 + \frac{2\xi}{\omega_o}s + \frac{s^2}{\omega_o^2}} \quad (6)$$

where:

$\sqrt{K/M} = \omega_o$, system undamped natural frequency and
$\beta/2\sqrt{KM} = \xi$, system damping ratio The inputs $y_1 = \Delta X$, $y_2 = \dot{X}$ and $y_3 = \ddot{X}$, as gain adjusted by a respective one of gain control means or multipliers 16 and then summed by adder 13a in FIG. 1, is seen to represent an analog mechanization of the form of the left hand member of Equations 1 and 2. Where the gain control inputs on lines 18 are correctly selected to correspond to those of the mathematical model of the physical plane 10, then the null condition of the right hand member of Equations 1 and 2 will be met, as indicated by a null output, $\epsilon = 0$ for adder 13a. Where, however, a null output is not obtained at adder 13a in response to the disturbance or perturbation of element 10, then the gains $\hat{a}_n$ of adjustable gain elements 16 are changed in response to the correlation of the measured plant response, $y_n$, with a function of such non-zero ($\epsilon \neq 0$) output of adder 13a as a reference, until such null (or a selected threshold value therefor) is obtained.

Figure 2:
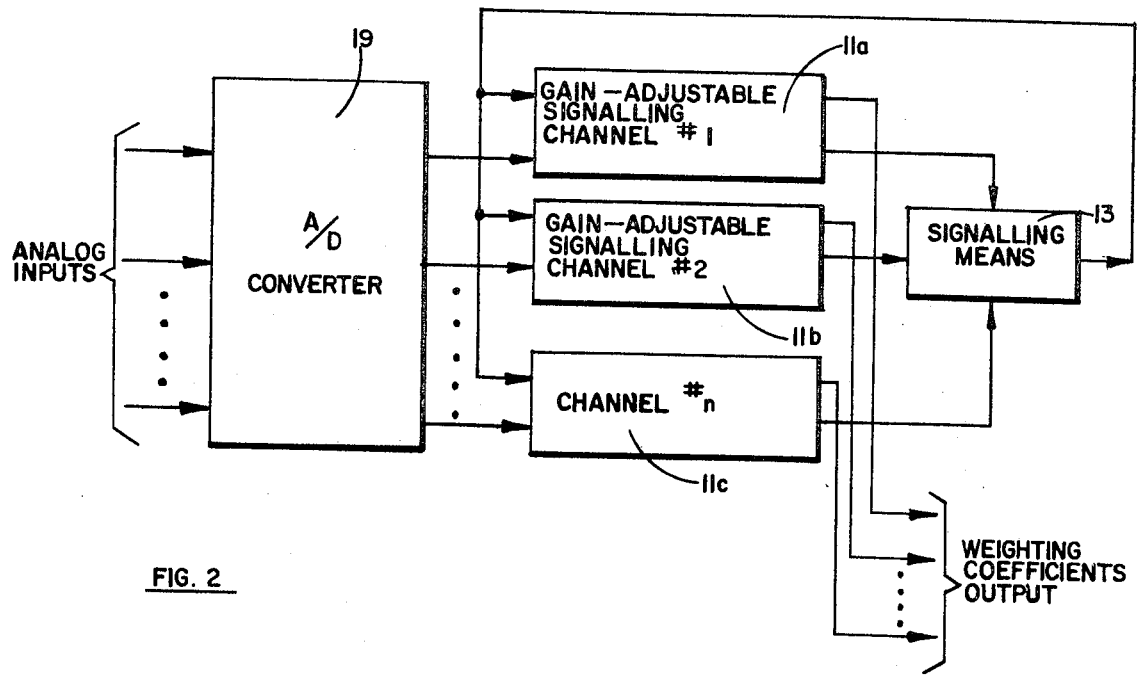
FIG. 2 is a block diagram of a digital system corresponding to the arrangement of FIG. 1.

Although the parameter estimation means of FIG. 1 has been described in terms of as an analog device, the concept is not so limited, and a digital mechanization may be employed in cooperation with suitable analog-to-digital conversion means 19 for interfacing a source of analog signals with such digital means for parameter estimation, as shown in FIG. 2. Also, although the embodiment of the concept has been illustrated in terms of a three channel system in conjunction with measurement of the three parameters of a second order linear element, the concept of the invention is not so limited and may be applied to the measurement of elements of lesser or higher order.

Further, although the technique for parameter estimation has been described in terms of measuring the response ($y_n$) of a plant subsequent to the disturbance or purturbation-excitation thereof, the concept is not so limited and comprehends parameter estimation from the measurement of the plant response during normal excitation thereof. In other words, the relationship of Equation 2, for the exemplary second order system described, may be more generally written as:

$$\Sigma a_n y_n = K\Delta X + \beta \dot{X} + M\ddot{X} = F(t) \quad (7)$$

Transposing:

$$K\Delta X + \beta \dot{X} + M\ddot{X} - F(t) = 0 \quad (8)$$

Substituting $$\Sigma a_n y_n - b_1 u_1 = 0 \quad (9)$$

where:

$$b_1 u_1 = F(t)$$

For a multi-parameter plant having multiple inputs or forcing function $\Sigma b_n u_n$, Equation 9 may be more generally written as follows:

$$\Sigma a_n y_n - \Sigma b_n u_n = 0 \quad (10)$$

An example of such a multiple parameter plant having multiple inputs or forcing functions is represented by the perturbation longitudinal equations of motion for a rigid body aircraft having as control inputs an elevator deflection $\Delta\delta_e$, a canard deflection $\Delta\delta_c$ and possibly also a thrust increment $\Delta T$ (due to throttle setting changes). Such equations of motion are generally known in the aircraft stability and control art, being set forth in part, for example, as Equations 10–66a to 10–66d at page 392 of the text, Airplane Performance Stability and Control, by Perkins and Hage, published by Wiley and Sons (1949); and as Equation III–9 at page III–7 of vol. II, "Dynamics of the Air Frame" of Flight Control System Manuals by D. T. McRuer et al., Bureau of Aeronautics Report AE–6–4–II. The longitudinal equations of motion, as described in the Bureau of Aeronautics reference, may be set forth as a set of simultaneous equations of forward acceleration, lift and pitching moment in response to an elevator deflection ($\delta_e$) and employing the parameters of forward airspeed ($u$), vertical velocity ($w$), and pitch angle ($\theta$) in standard nomenclature in Laplace notation:

$$(s-X_u)u(s)-X_w W(s)+g\theta(s)=0$$
$$-Z_u u(s)+(s-Z_w)W(s)-sU_0\theta(s)=Z_{\delta_e}\delta_e$$
$$-M_u u(s)-(sM_{\dot{w}}+M_w)W(s)+$$
$$(s-M_q)s\theta(s)=M_{\delta_e}\delta_e \quad (11)$$

Often, the parameter, angle of attack $$\left(\alpha(s)\approx\frac{W(s)}{U_0}\right)$$

is used alternatively to $W(s)$, depending upon which sensors are available and what errors are present in the use of particular sensors. Also, because perturbation of the usual vehicle control surfaces has little effect upon the aircraft forward speed, Equation 11 may be simplified:

$$\ddot{\theta}-(M_\alpha+M_a Z_a)\alpha_p-(M_a+M_q)\dot{\theta}$$
$$-(M\delta_e+M_a Z_{\delta_e})\delta_e=0 \quad (12)$$

Simplifying the coefficients (which are assumed to remain constant during the identification period):

$$\ddot{\theta}+a_1\alpha_p+a_2\dot{\theta}-b_1\delta_e=0 \quad (13)$$

Where canard control surfaces are employed, in addition to the conventional elevator control surfaces (as described for example in U.S. Pat. 3,240,447 to R. Olshausen for Vehicle Control System), then an additional forcing function ($b_2 u_2 = b_2 \delta_c$) would be included in Equations 11 and 12, whereby Equation 13 would approach the general form of Equation 10, having both multiple forcing functions and multiple response parameters.

Figure 4:
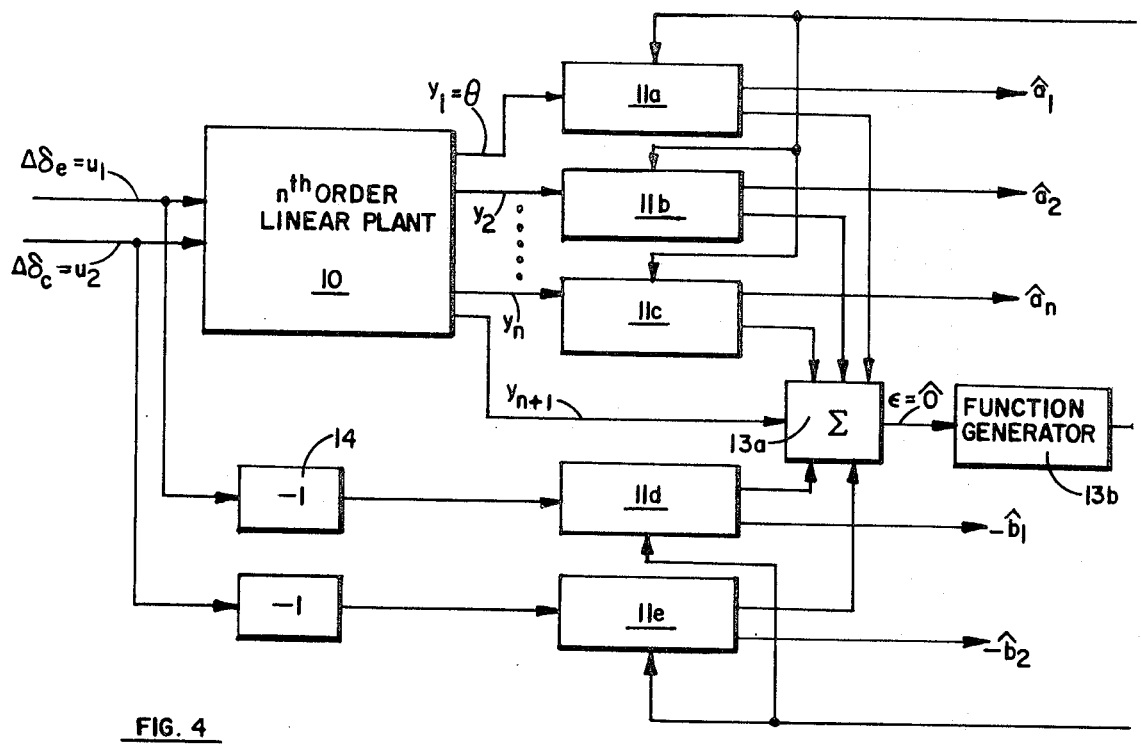
FIG. 4 is a block diagram of a system embodying a further aspect of the inventive concept.

The mechanization of a parameter estimation device for such a multiple parameter plant is shown in block form in FIG. 4. The basic difference of such arrangement over that of FIG. 1 is the inclusion of provisions responsive to the forcing function of or input to a plant-to-be-identified, whereby plant identification may be made "on-stream" during normal excitation thereof. Where such excitation is of two forms ($u_1$ and $u_2$, corresponding to say, an elevator deflection $\delta_e$ and canard deflection $\delta_c$ in a dual control mode aircraft), then such provisions include, for each such excitation source, sign-changing or signal inverting means 14 connected in series with a gain-adjustable signalling channel 11d or 11e to an input of signal summing means 13a. Where control inputs $u_1$ and $u_2$ are mechanically applied, as in the case of $\delta_e$ and $\delta_c$, then mechanical motion transducers or position pick-off potentiometers (not shown) are required to convert such parameters to suitable electrical signal form, as is well understood in the art.

Although the arrangement of FIG. 4 is illustrated in terms of two applied inputs $u_1$ and $u_2$, it is clear that the concept is equally applicable to evaluation of a plant involving fewer or more applied inputs.

Figure 5:
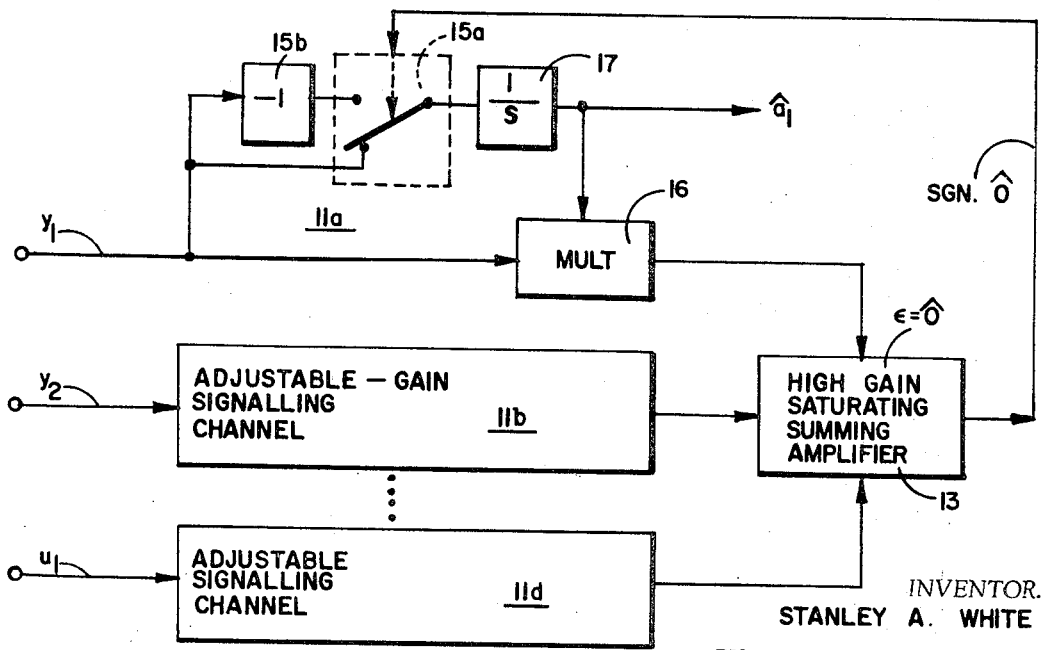
FIG. 5 is a schematic diagram illustrating a preferred arrangement of certain elements of the systems of FIGS. 1 and 4.

The general arrangement of signalling means 13 of FIG. 1 has been described in terms of an adder 13a and function generator 13b. However, in a preferred embodiment the function of elements 13a and 13b may be performed by a single common signalling element. For example, a preferred function to be provided by a function generator 13b has been found to be a relay function or fixed magnitude signal having a sense indicative of the sense of the combined sum of the inputs to adder 13a. Such function may be combined with that of adder 13a by employing a high-gain, readily-saturable summing amplifier as shown by element 13 in FIG. 5. Because the reference signal output from such saturating summing amplifier is essentially indicative of sense only and substantially invariant in magnitude, such reference signal does not modulate the gain or signal level of the signal input to correlating-integrator 17. Therefore, a corresponding simplification may be made in the mechanization of multiplier 15 (of FIG. 1). Such simplification involves the substitution of a bipolar relay 15a and signal inverter 15b, as shown in FIG. 5.

Figure 6:
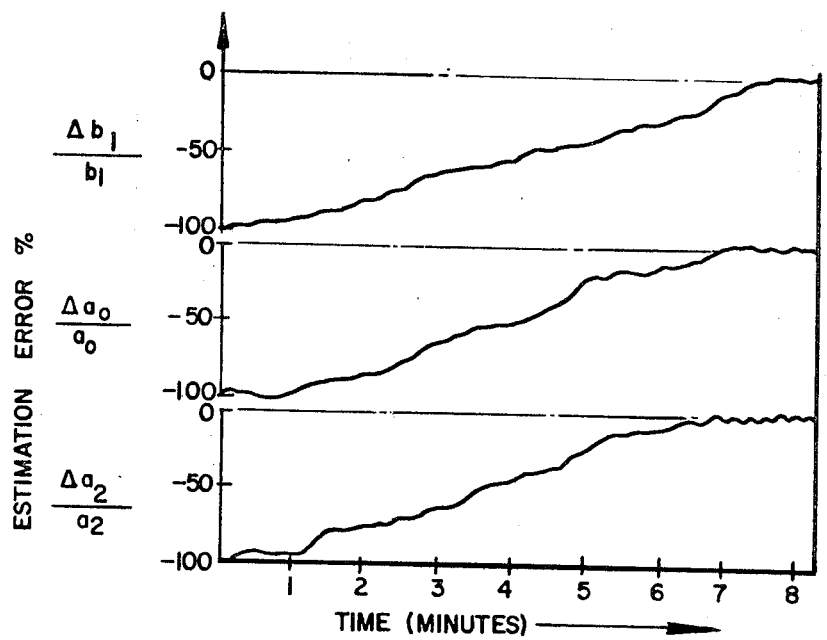
FIG. 6 is a family of time histories for an exemplary system application, illustrating a representative response of the system.

In normal operation of the arrangement of FIG. 4, the correlator employs a selected sense of the applied input to be correlated ($y_1$, $y_2$, $u_1$) corresponding to the sense of the reference signal output from element 13. Further, by suitably preselecting the sense convention employed by the correlator for an applied forcing function $u_1$, the signal inverter 14 (of FIG. 4) may be omitted.

Where the coefficients to be estimated ($a_n$ and $b_n$) are relatively constant or unchanging during the parameter measurement period, the difference $\Delta a_n = a_n - \hat{a}_n$, between the probable coefficient value $a_n$ and the estimated coefficient $\hat{a}_n$ (as indicated by the output of a corresponding correlating integrator 17) progressively approaches a null, where a suitable mathematical model has been selected to describe the plant whose coefficients are being identified. A representative normalized response set $$\Delta a_n/a_n, \Delta b_n/b_n$$

for a single first order system is shown as a function of time in FIG. 6.

In the above-described arrangements, means have been disclosed for varying the gains of each signalling channel and corresponding to the estimated coefficients $a_n$, $b_n$, estimated for a given mathematical model, $$\Sigma a_n y_n + \Sigma b_n u_n = 0$$

whereby a relative weighting among such coefficients is obtained. Of course, in an arrangement where all of the sensed variables ($y_n$, $u_n$) are subjected to a correlator-driven adjustable gain, it is conceivable that the correlation integrators may cooperate to drive all the gains to zero, satisfying the null condition as:

$$\Sigma a_n y_n + \Sigma b_n u_n = \Sigma 0 y_n + \Sigma 0 u_n = 0$$

Such trivial solution, of course, is not of practical interest and may be avoided by the simple expedient of employing a reference gain such as unity for one of the sensed variables of interest. In this way, a non-zero input to summing means 13 (in response to a disturbance of plant 10) is avoided in general; and a null output from summing means 13 occurs (in general) in response to an appropriate relative weighting among the estimates of the several coefficients of interest. Thus, such unity gain serves as a normalized gain reference, the coefficients being expressed as ratios thereof.

For example, Equations 12 and 13 have been rendered in a normalized form (from Equation 11 for the variable, pitch acceleration, $\ddot{\theta}$, shown with a coefficient of unity, whereby the other coefficients of Equation 13 are understood to be relatively weighted or normalized relative thereto. The corresponding mechanization of such relationship is generally indicated in the arrangement of FIG. 4 by the fixed-gain employed in the signalling channel for signal $y_{n-1}$.

Although the concept of the invention has been described in terms of analog signalling means for the correlator (elements 15a, 15b and 17) and correlation-responsive gain changer 16 in FIG. 5, for example, the concept of the invention is not so limited and digital signalling means is contemplated, as indicated by FIG. 2 (described above) and as shown in further detail in FIG. 3.

Figure 3:
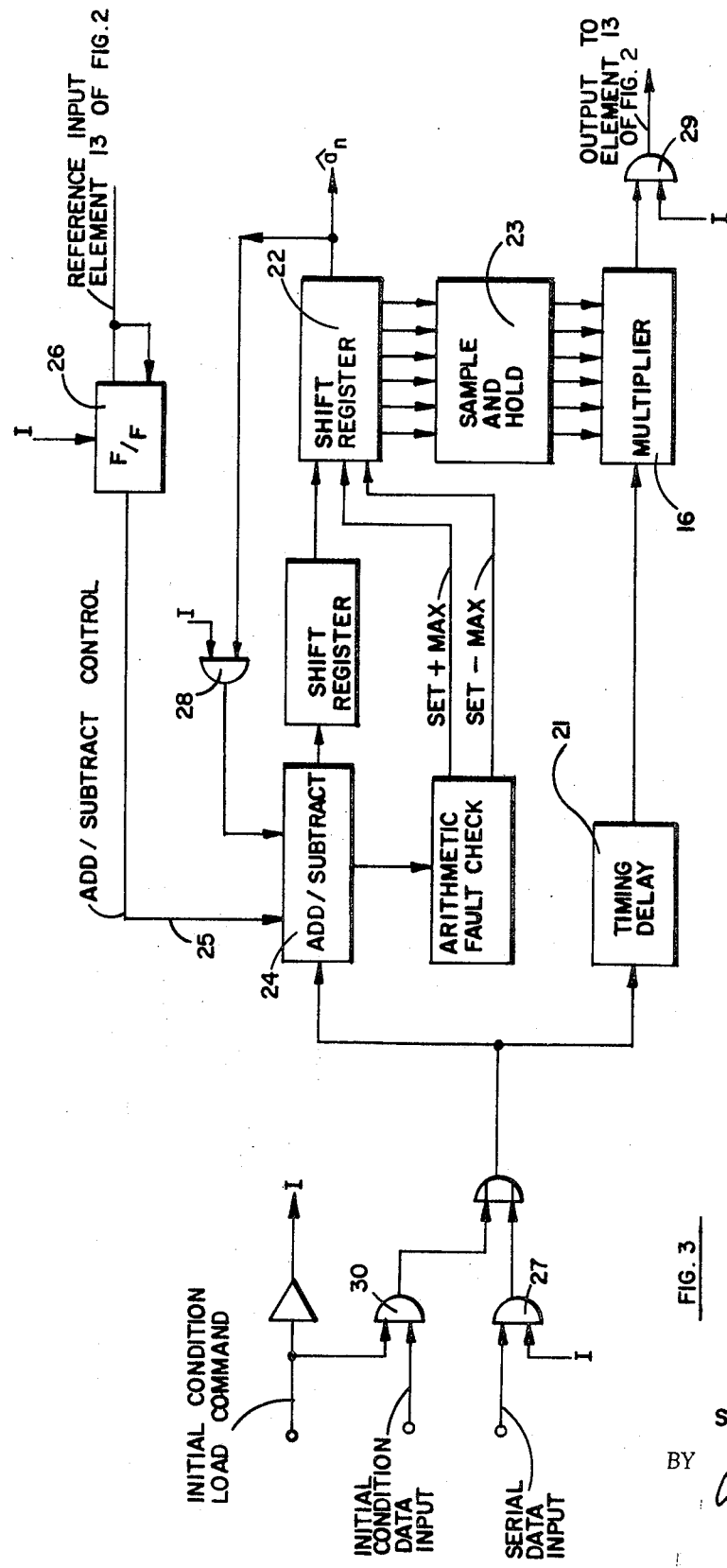
FIG. 3 is a schematic arrangement of one of the gain-adjustable digital signalling channels of FIG. 2.

Referring now to FIG. 3, there is illustrated a schematic arrangement of one of the gain-adjustable digital signalling channels of FIG. 2. There is provided a digital multiplier 16 having a first input coupled to a serial data input source by means of a timing delay 21. A second input is coupled to the output of a shift register 22 by sample-and-hold means 23. There is also provided add/substract means 24 having a first input coupled to the serial data input source and a second input coupled to an output of register 22, and further having an add/substract control input 25. The closed loop arrangement of shift register 22 and element 24 cooperates in the manner of an accumulator or digital integrator, as is well understood in the art, as to correspond to element 17 in FIG. 5. A reference input having a state indicative of the sense of a reference function (corresponding to the output of element 13 in FIG. 5) is applied to the inputs of a (gated) flip-flop 26 to generate a two-state control signal on control line 25 of add/substract means 24, corresponding to the cooperation of elements 15a and 15b in FIG. 5. Hence, it is to be appreciated that the arrangement of FIG. 3 comprises a correlator and correlation-responsive gain-changing means. The illustrated inclusion of "AND" gates 27, 28 and 29 is for system synchronization and control purposes, as is well understood in the digital system art, and does not relate to the concept of correlation-responsive gain-adjustment means. Means for arithmetic fault checking may also be included, if desired, to prevent overflow.

The representative response period required for the disclosed concept to effect an estimation of a selected set of coefficients, as illustrated in FIG. 6, is a function of the extent and nature of the initial system estimation and modelling errors. However, engineering design experience or other source of a prior knowledge of the plant 10 under investigation, may allow the insertion of "best guesses" or estimates as initial conditions in the correlation integrators of the system correlators, as to reduce the time interval required within which to effect an estimation by the disclosed automatic means.

Although, the concept of the invention has been described in terms of the identification or estimation of the coefficients of a lumped parameter linear mathematical model, the concept of the invention is not so limited and is equally applicable to the estimation of coefficients of non-linear mathematical models.

Accordingly, there has been described means for automatically and efficiently estimating the coefficients of a mathematical model describing a physical plant of unit-under-test in response to the sensed response variables of such plant.

Although the invention has been described and illustrated in detail, it is to be clearly understood that the same is by way of illustration and example only and is not to be taken by way of limitation, the spirit and scope of this invention being limited only by the terms of the appended claims.

I claim:
1. Parameter correlation means, comprising a plurality of gain adjustable signalling channels, each channel responsive to a sensed signal associated with a parameter of a set of parameters-to-be-quantitatively correlated,
   each channel comprising a signal correlator having a reference input and a signal input for providing an output indicative of the time integral of the products of said inputs, each said channel further including gain control means having a gain control input responsively coupled to said output of said correlator for controlling the gain of said signal channel; and
   signalling means responsive to the output of the gain control means of each said channel for providing a reference signal indicative of a preselected function of the sum of said outputs, the reference inputs of said correlators being commonly responsive to said reference signal,
   whereby the output of each correlator represents a weighting factor indicative of the correlation of the signal input of said correlator with said reference signal.

2. A method of estimating the quantitative coefficients of the lumped parameters comprising a mathematical model of a multi-parameter system, and comprising the steps of
   disturbing the state of said system;
   measuring the transient parametric response of said multi-parameter system subsequent to such disturbed state;
   gain-changing each component response of said measured parametric response as a function of the correlation of said component response with a reference function; and
   generating said reference function as a preselected function of the sum of said gain-changed component responses,
   whereby each said function of said correlations represents a mutually exclusive one of the coefficients of said mathematical model.

3. A method of estimating the coefficients of the lumped parameters comprising a mathematical model of a disturbed multi-parameter system, and comprising the steps of
   measuring the transient parametric response of said multi-parameter system subsequent to a state disturbance thereof;
   gain changing each component response of said measured parametric response as a function of the correlation of said component response with a reference function; and
   generating said reference function as a preselected function of the sum of said gain-changed component responses,
   whereby each said function of said correlations is indicative of a mutually exclusive one of the coefficients of said mathematical model.

4. Means for determining the coefficients $a_n$ of a lumped parameter mathematical model, $\Sigma a_n y_n = 0$, and comprising
   a plurality of gain-adjustable signalling channels, each channel adapted to be responsive to a mutually exclusive one of the variables $y_n$ of the mathematical model,
      each channel comprising correlation means having a reference input for adjusting the gain of said gain-adjustable channel as a function of the correlation of an input to said signalling channel with an applied reference input; and
   signalling means responsive to a gain-adjusted output of each of said signalling channels for providing a reference signal indicative of a preselected function of the sum of said gain-adjusted outputs of said signalling channels, the reference inputs of said correlators being commonly responsive to said reference signal,
   whereby an output of each correlation means is indicative of a coefficient $a_n$ of that variable $y_n$ correlated by said correlator.

5. The device of claim 4 in which each said gain adjustable signalling channel includes
   a first and second multiplier, each having a first input commonly connected to define an input terminal of said signalling channel and further having a second input, the second input of said first multiplier being coupled to an output of said signalling means; and
   an integrator having an input coupled to an output of said first multiplier and further having an output coupled to said second input of said second multiplier.

6. The device of claim 5 in which said signalling means comprises summing means responsive to the multiplier outputs of each of said second multipliers for providing a signal indicative of the sum of said multiplier outputs; and function generator means responsive to said summing means for providing an output indicative of a preselected function of said sum.

7. The device of claim 6 in which said function generator is of the relay function type which provides a thresholded two-state output indicative of the sense of said sum.

References Cited

UNITED STATES PATENTS

| | | | |
|---|---|---|---|
| 2,959,347 | 1960 | Kearns | 235—151.3 XR |
| 3,296,422 | 1967 | Ruskr | 244—77 XR |
| 3,393,301 | 1968 | Valstar | 235—151.31 |
| 3,412,961 | 1968 | Howard | 235—150.2 XR |
| 3,446,946 | 1969 | Andeen | 235—150.1 |

MALCOLM A. MORRISON, Primary Examiner

E. J. WISE, Assistant Examiner

U.S. Cl. X.R.

235—181, 182, 150.1, 150.2; 244—77